Patented Aug. 4, 1953

2,647,913

UNITED STATES PATENT OFFICE 2,647,913

HYDROXY ETHER SULFATES HAVING HIGH SURFACE-ACTIVITY

Milton Kosmin, Dayton, Ohio, assignor to Monsanto Chemical Company, St. Louis, Mo., a corporation of Delaware No Drawing. Application August 14, 1950, Serial No. 179,384

4 Claims. (Cl. 260—458)

The present invention relates to compounds having high surface-activity in aqueous solutions and to processes for preparing the said compounds.

In my prior Patents Nos. 2,508,035 and 2,508,036, issued May 16, 1950 I have disclosed polyglycol ethers of certain branched chain alcohols, namely, 5-ethyl nonanol-2 and 2-n-propyl heptanol. These products are produced by condensing ethylene oxide with the respective alcohols. While these compounds show especially low and therefore advantageous wetting out speeds when aqueous solutions thereof are tested by the Draves test, these products have been found to be somewhat deficient in detergency.

I have now found that if at least 3, but less than 11, moles of ethylene oxide be condensed with 2-butyloctanol-1 and the resulting hydroxy ethers are converted to alkali metal sulfates there is obtained a series of products which exhibits not only excellent wetting out properties but also excellent detergency.

The present products are prepared by condensing ethylene oxide with 2-butyloctanol-1 until at least 3 moles, but not in excess of 11 moles, have been condensed with the alcohol and then sulfating and neutralizing the resulting condensation product. The condensation may be carried out by mixing ethylene oxide either as gas or liquid with the alcohol and heating to a temperature of from 110 to 170° C. The condensation reaction is aided by the presence of a catalyst. For this purpose any alkaline materials, such as an alkali metal hydroxide or alcoholate may be used. The catalyst may be employed in relatively small amounts, usually from 0.5% to 1% being employed. The catalyst is added to the liquid alcohol at the beginning of the reaction. Sulfation of the alcohol-ethylene oxide condensate may be effected in known manner; for example by reaction with dilute or concentrated sulfuric acid, oleum, sulfur trioxide, chlorosulfonic acid, etc. The sulfuric acid esters thus obtained are then neutralized, i. e., converted to salts by treatment with an alkali metal salt or hydroxide, e. g., sodium or potassium hydroxide or carbonate.

The products so produced are alkali metal sulfates of hydroxy ethers and are believed to have structure:

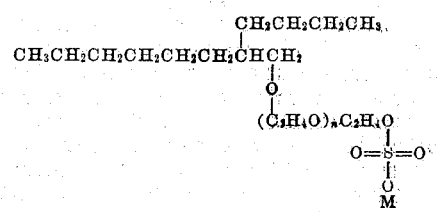

in which $n$ is an integer having a value of from 3 to 5 and M is alkali metal or ammonium.

The following examples will further illustrate this invention:

Example 1

260.0 g. (1.396 moles) of 2-butyloctanol-1 was placed in a glass flask, 1.5 g. of powdered KOH added and the contents then heated to 120° C. A stream of gaseous ethylene oxide was passed into the alcohol by means of a gas dispersing tube and the stream continued until 184 g. of ethylene oxide had combined. The mass became hot due to the exothermic reaction heat and the temperature was controlled by cooling the flask by the application of cold water to the exterior. In this way the temperature was maintained at about 150° during the progress of the reaction.

The product obtained corresponds to the triethylene glycol ether of 2-butyloctanol-1. To 110 g. of this condensation product there was added dropwise, at a temperature of from 25° C. to 30° C. and during a period of 15 minutes, 52 g. of 100% sulfuric acid. The resulting mixture was then stirred for one hour at room temperature (25° C.). Approximately 10 ml. of water and 300 ml. of ethyl alcohol were then added to the solution and the product was neutralized with 40% aqueous sodium hydroxide. The sodium sulfate which formed was filtered off and washed with alcohol. From the combined filtrate and washings the alcohol was stripped off under water pump vacuum using a Vigreux column, and the product was finally dried on the column during 4 hours at a pot temperature of 55° C. and a pressure of 4 mm. There was thus obtained 136.0 g. (93.5% theoretical yield) of the sodium salt of sulfated triethylene glycol ether of 2-butyloctanol-1.

Example 2

A portion of the 2-butyloctanol-1 ethylene oxide condensation product obtained above, weighing 332 g., was further treated with 46 g. of ethylene oxide using the same apparatus as described above. The product obtained corresponded to the tetraethylene glycol ether of 2-butyloctanol-1. 103 g. of this product was sulfated and then neutralized as described above, except that 43 g., instead of 52 g., of concentrated sulfuric acid was used and that after column-drying, the alcohol-stripped, neutralization product was further dried in the vacuum over for 24 hours at a temperature of 55° C. There was thus obtained 124.0 g. (94% theoretical yield) of the sodium salt of sulfated tetraethylene glycol ether of 2-butyloctanol-1.

Example 3

A portion of the 2-butyloctanol-1 ethylene oxide condensation product obtained in Example 2, weighing 274 g. was further treated with 34 g. of ethylene oxide using the same apparatus as described above. The product obtained corresponded to the pentaethylene glycol ether of 2-butyloctanol-1. 60.4 g. of this product was sulfated and then neutralized as described in Example 1, except that 23 g., instead of 52 g., of concentrated sulfuric acid was used and that after column-drying the alcohol-stripped, neutralization product was further dried in the vacuum oven for 24 hours at a temperature of 55° C. There was thus obtained 70 g. (92.5% theoretical yield) of the sodium salt of sulfated pentaethylene glycol ether of 2-butyloctanol-1.

Relative detergency may be measured by any quantitative method; however for the purpose of evaluating the present and related products I have used the method described by Jay C. Harris in Soap and Sanitary Chemicals for August and September 1943. By the application of this method it is possible to evaluate the detergency of a product in terms of any standard detergent. For convenience I have compared the detergency of the present and related products with the detergency of Gardinol WA, which is a commercial detergent produced by sulfating the alcohols derived by hydrogenation of coconut oil fatty acids.

The detergency of the present products and a related product as determined by the Harris method is illustrated in the following table:

| Alcohol Sulfates | Detergency—Percent of Gardinol | | | |
|---|---|---|---|---|
| | 100% Active | | Built [1] | |
| | 50 p. p. m. | 300 p. p. m. | 50 p. p. m. | 300 p. p. m. |
| Example 1 | 97 | 110 | 114 | 114 |
| Example 2 | 107 | 106 | 128 | 123 |
| Example 3 | 108 | 116 | 121 | 137 |
| Sodium 2-Butyloctanol-1 sulfate | 37 | 30 | 86 | 104 |

[1] The builder consisted of 40 parts of tetrasodium pyrophosphate 40 parts of starch for each 20 parts of the active constituent.

The speed of wetting, as measured by the Draves test of the products when dissolved in water to form solutions of the indicated concentrations gave the values shown below. Similarly obtained values for sodium 2-butyloctanol-1 sulfate are included for purposes of comparison.

| Product Tested | Draves Wetting (Seconds at percent concentration) | | | | |
|---|---|---|---|---|---|
| | 0.5 | 0.25 | 0.125 | 0.062 | 0.031 |
| Example 1 | Inst. | 2.2 | 5.5 | 22.2 | 119 |
| Example 2 | Inst. | 2.4 | 6.2 | 18.0 | 77 |
| Example 3 | Inst. | 2.2 | 5.7 | 15.9 | 57 |
| Sodium 2 - butyloctanol - 1 sulfate | Inst. | 4.8 | 33.6 | 180+ | |

What I claim is:

1. Compounds having the formula:

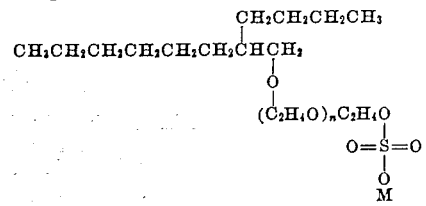

where $n$ has a value of at least 2 but not in excess of 10, and M is a member of the class consisting of alkali metal and ammonium.

2. Compounds having the formula:

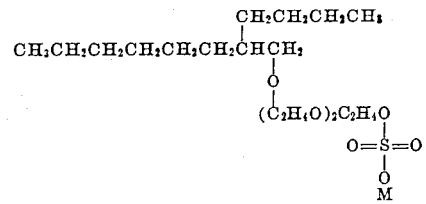

in which M is a member of the class consisting of alkali metal and ammonium.

3. Compounds having the formula:

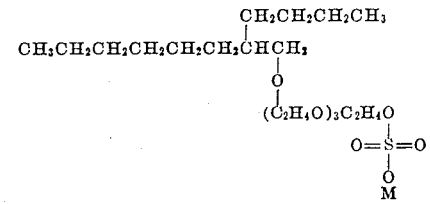

in which M is a member of the class consisting of alkali metal and ammonium.

4. Compounds having the formula:

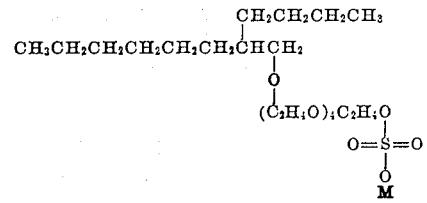

in which M is a member of the class consisting of alkali metal and ammonium.

MILTON KOSMIN.

References Cited in the file of this patent

UNITED STATES PATENTS

| Number | Name | Date |
|---|---|---|
| 2,174,761 | Schuette et al. | Oct. 3, 1939 |

FOREIGN PATENTS

| Number | Country | Date |
|---|---|---|
| 810,382 | France | Mar. 20, 1937 |